US009222200B2

(12) United States Patent
Tai

(10) Patent No.: US 9,222,200 B2
(45) Date of Patent: Dec. 29, 2015

(54) SPINNING DEVICE

(71) Applicant: Industrial Technology Research Institute, Chutung, Hsinchu (TW)

(72) Inventor: Chin-Chih Tai, Hsinchu (TW)

(73) Assignee: INDUSTRIAL TECHNOLOGY RESEARCH INSTITUTE, Chutung Township, Hsinchu County (TW)

( * ) Notice: Subject to any disclaimer, the term of this patent is extended or adjusted under 35 U.S.C. 154(b) by 70 days.

(21) Appl. No.: 14/133,184

(22) Filed: Dec. 18, 2013

(65) Prior Publication Data

US 2014/0170256 A1    Jun. 19, 2014

Related U.S. Application Data

(63) Continuation-in-part of application No. 13/719,945, filed on Dec. 19, 2012.

(30) Foreign Application Priority Data

Sep. 9, 2013    (TW) .............................. 102132378 A

(51) Int. Cl.
*D01D 5/24* (2006.01)
*D01D 4/02* (2006.01)
(Continued)

(52) U.S. Cl.
CPC .............. *D01D 5/24* (2013.01); *B29C 47/0023* (2013.01); *B29C 47/122* (2013.01); *D01D 4/02* (2013.01);
(Continued)

(58) Field of Classification Search
CPC ........ D01D 4/02; D01D 5/24; B29C 47/0023; B29C 47/003; B29C 47/0035; B29C 47/0866; B29C 47/122; B29C 47/24; B29C 47/36; B29C 47/31
See application file for complete search history.

(56) References Cited

U.S. PATENT DOCUMENTS 3,853,661 A * 12/1974 Sudo ................... B29C 47/0023
156/244.14
4,102,625 A * 7/1978 Luthi et al. .................... 425/464
(Continued)

FOREIGN PATENT DOCUMENTS

CN    1103814    6/1995
CN    1234840    11/1999
(Continued)

OTHER PUBLICATIONS

Tai et al., "Development of adsorbent hollow fibres for environmental applications", The Seventh World Chemical Engineering Congress, C17-002, Engineering for Life—Sustainable and Clean Technologies, Oct. 31, 2012., 10 pages, Glasgow, UK.
(Continued)

*Primary Examiner* — Katherine Zalasky
*Assistant Examiner* — Benjamin Lebron
(74) *Attorney, Agent, or Firm* — Muncy, Geissler, Olds & Lowe, P.C.

(57) ABSTRACT

A spinning device is disclosed. The spinning device includes a tube body, a sleeve component, a jacket tube and a lid. The tube body has a first through orifice in a vertical direction, the sleeve component has a second through orifice for the tube body to be mounted therein to form a fluid passage in between; the jacket tube has a third through orifice for the sleeve component and the tube body to be mounted therein. A first opening and second opening are formed on the wall of the jacket tube, allowing the second opening to be coupled with the fluid passage. The lid is coupled to one end of the jacket tube, and has a fourth through orifice, allowing the tube body to rotate with respect to the sleeve tube, jacket tube and the lid, thereby making a the hollow fiber having a spiral passage.

12 Claims, 3 Drawing Sheets

(51) Int. Cl.
  *B29C 47/02* (2006.01)
  *B29C 47/24* (2006.01)
  *B29C 47/00* (2006.01)
  *B29C 47/12* (2006.01)
  *B01D 69/08* (2006.01)

(52) U.S. Cl.
  CPC ............ *B01D 69/082* (2013.01); *B01D 69/085* (2013.01); *B01D 69/087* (2013.01); *B01D 69/088* (2013.01)

(56) References Cited

U.S. PATENT DOCUMENTS

| | | | | |
|---|---|---|---|---|
| 4,289,716 | A | * | 9/1981 | Voigt .......................... 264/45.9 |
| 4,582,008 | A | * | 4/1986 | Marsh et al. ................. 112/220 |
| 4,721,589 | A | * | 1/1988 | Harris ......................... 264/40.1 |
| 4,993,250 | A | * | 2/1991 | Platt ................................ 72/145 |
| 5,139,668 | A | | 8/1992 | Pan et al. |
| 5,626,758 | A | | 5/1997 | Belfort |
| 6,824,679 | B1 | | 11/2004 | Dzengeleski et al. |
| 2003/0141238 | A1 | | 7/2003 | Herczeg |
| 2008/0022725 | A1 | * | 1/2008 | Sarchi et al. ..................... 65/435 |
| 2009/0064719 | A1 | * | 3/2009 | Koenig et al. ..................... 66/17 |
| 2009/0305871 | A1 | * | 12/2009 | Perera et al. ..................... 502/60 |
| 2010/0035751 | A1 | | 2/2010 | Perera et al. |

FOREIGN PATENT DOCUMENTS

| | | |
|---|---|---|
| CN | 1552507 | 12/2004 |
| CN | 2706481 | 6/2005 |
| CN | 101368302 | 2/2009 |
| CN | 101578129 | 11/2009 |
| CN | 102089070 | 6/2011 |
| CN | 102389714 | 3/2012 |
| EP | 1913183 | 4/2008 |
| JP | 20020320831 | 6/2004 |
| TW | 500846 | 9/2002 |
| TW | 200700352 | 1/2007 |
| WO | WO 2007007051 | 1/2007 |
| WO | WO 2008110820 | 9/2008 |

OTHER PUBLICATIONS

Lee et al., "Manufacture and Characterisation of Silicalite Monoliths", Adsorption Science and Technology, 18(2), 2000, pp. 147-170.
Tai, "Novel Adsorbent Hollow Fibres", PhD thesis, University of Bath, UK., 2007, 2 pages.
Li et al., "Zeolite Monoliths for Air Separation, Part 1: Manufacture and Characterisation", Trans IChemE Part A, 76, 1998, pp. 921-930.
Lively et al., "Hollow Fiber Adsorbent for $CO_2$ Removal from Flus Gas", Ind. Eng. Chem. Res., 2009, vol. 48, pp. 7314-7324.
Bhandari et al., "Hollow Fiber Sorbents for Desulfurization of Natural Gas", Ind. Eng. Chem. Res., 2010, vol. 49, pp. 12038-12050.

* cited by examiner

SPINNING DEVICE

CROSS-REFERENCE TO RELATED APPLICATION

The present application is based on, and claims priority from U.S. patent application Ser. No. 13/719,945 filed on Dec. 19, 2012 and Taiwanese Patent Application No. 102132378 filed on Sep. 9, 2013, and the disclosures of the above related applications are incorporated by reference herein.

TECHNICAL FIELD

The present disclosure relates to a spinning device.

BACKGROUND

In general, a hollow fiber membrane or material is made by a single layered or multi-layered spinneret, through a phase inversion method. The inner lumens are formed in a vertical direction. The foregoing spinning process involves using a wet spinning or dry spinning device, which is assembled from tubes and modules or monoliths, such that a fluid passage is formed therein. The inner lumens of the hollow fiber material are all arranged in the vertical direction, and the material still needs improvements.

The present disclosure provides a spinning device for making a material with a hollow spiral structure by one single step process

SUMMARY

The present disclosure provides a spinning device, comprising: a tube body having a first through orifice in a vertical direction; a sleeve component having a second through orifice in the vertical direction, wherein the tube body is pivotally disposed in the second through orifice to form a fluid passage between the tube body and the sleeve tube; a jacket tube having a third through orifice in the vertical direction, and having a first sub jacket tube vertically and sequentially connected with a second sub jacket tube, and a third sub jacket tube in the third through orifice, such that the sleeve component and the tube body are respectively mounted in the first sub jacket tube, the second sub-jacket tube and the third sub jacket tube, wherein a first liquid-tight coupling is formed between the sleeve component and the third sub-jacket tube, and the second sub jacket tube and the third sub jacket tube have a first opening and a second opening respectively, and wherein the second opening is connected to the fluid passage; and a lid mounted to an end of the third sub-jacket tube of the jacket tube, and having a fourth through orifice in the vertical direction, such that the tube body is pivotally disposed in the jacket tube, penetrates the fourth through orifice, and is rotatable with respect to the sleeve component, the jacket tube, and the lid.

BRIEF DESCRIPTION OF THE DRAWINGS

The present disclosure can be more fully understood by reading the following detailed description of the preferred embodiments, with reference made to the accompanying drawings, wherein.

DETAILED DESCRIPTION

Figure 1A:
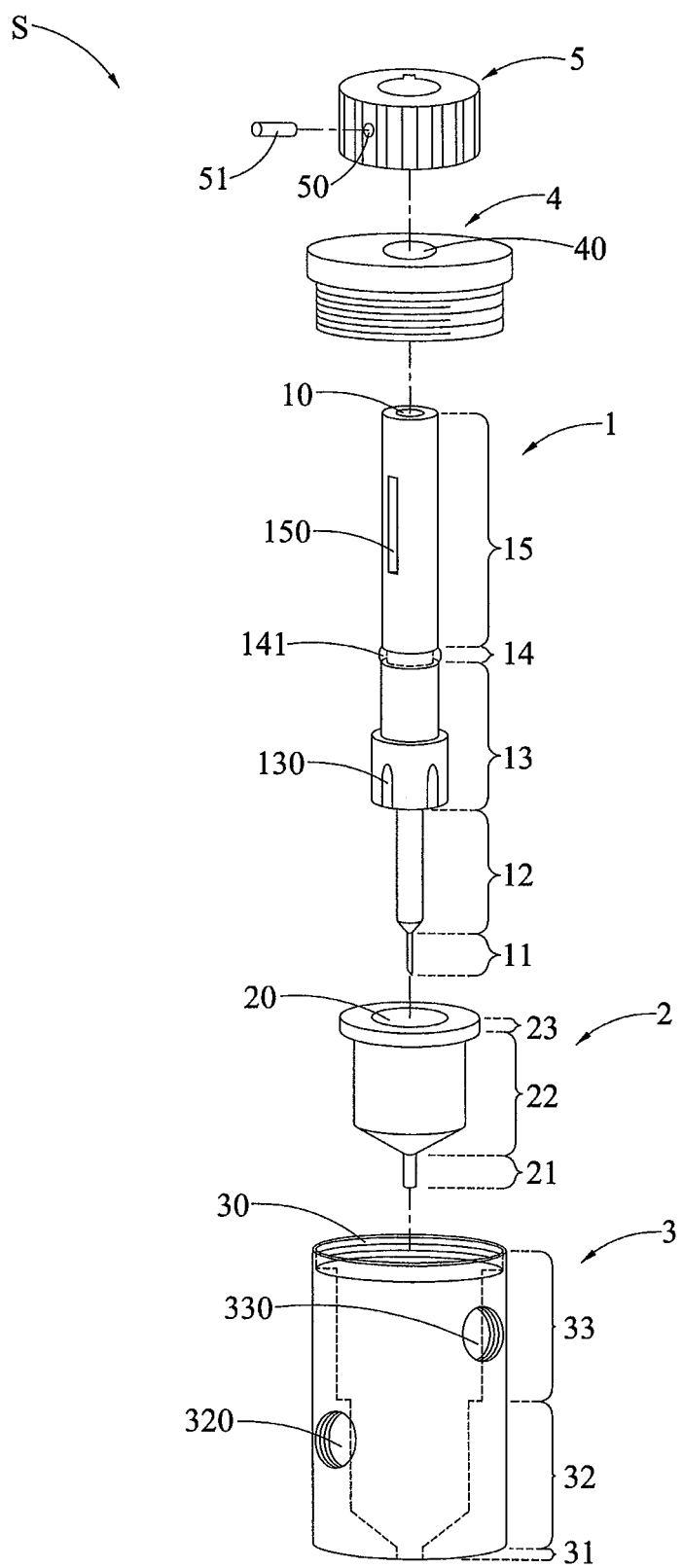
FIG. 1A and FIG. 1B are schematic views respectively showing the assembly and the disassembly of the spinning device according to an embodiment of the present disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

It is to be understood that the scope of the present invention is not limited to the disclosed embodiments. On the contrary, it is intended to cover various modifications and similar arrangements. The scope of the claims, therefore, should be accorded the broadest interpretation so as to encompass all such modifications and similar arrangements. In addition, words such as "on", "top" and "a" are used to explain the preferred embodiment of the present disclosure only and should not limit the scope of the present disclosure.

Figure 1B:
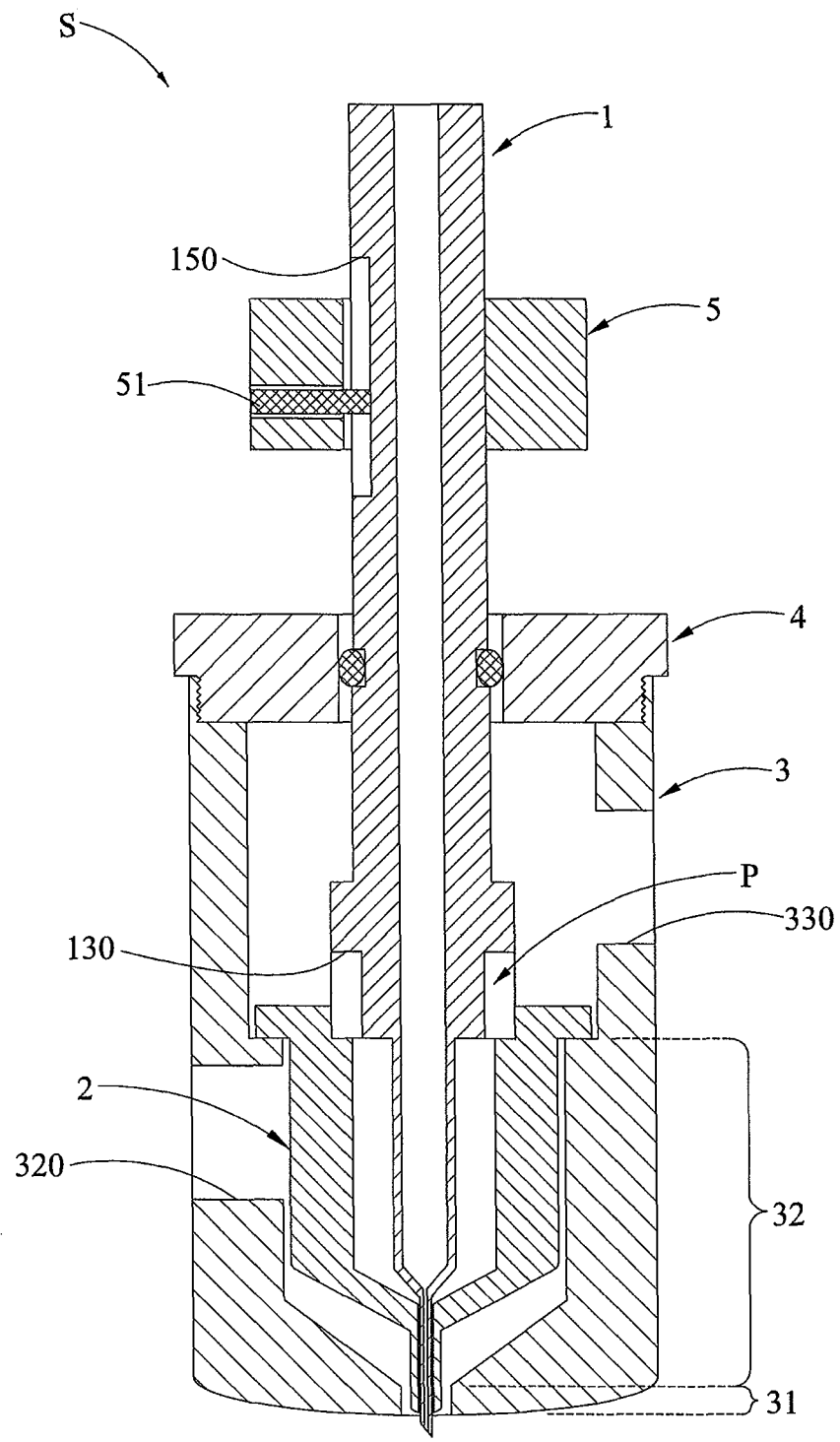

FIG. 1A and FIG. 1B are schematic views respectively showing the assembly and the disassembly of the spinning device of one embodiment of the present disclosure.

As shown in the drawings, the spinning device S comprises a tube body 1, sleeve component 2, a jacket tube 3 and a lid 4. The tube body 1 has a first through orifice 10 in a vertical direction, and has a first tube 11 vertically and sequentially connected to a second tube 12, a third tube 13, a fourth tube 14 and a fifth tube 15.

The sleeve component 2 has a second through orifice 20 in the vertical direction, and has a first sleeve 21 vertically and sequentially connected to a second sleeve 22 and a third sleeve 23. The first tube 11 and second tube 12 is respectively mounted in the second through orifice 20 of the first sleeve 21 and second sleeve 22. A fluid passing passage P is formed between the third tube 13 and third sleeve 23.

The jacket tube 3 has a third through orifice 30 in the vertical direction, and has a first sub jacket tube 31 vertically and sequentially connected to a second sub jacket tube 32, and a third sub jacket tube 33 such that the first sleeve 21, second sleeve 22, and third sleeve 23 are respectively disposed in the third through orifice 30 of the first sub jacket tube 31, the second sub jacket tube 32, and the third sub jacket tube 33. A liquid-tight coupling is formed between the third sleeve 23 and the jacket tube 3. The second sub jacket tube 32 and the third sub jacket tube 33 have a first opening 320 and a second opening 330 respectively, wherein the second opening 330 is connected to the fluid passage P.

The lid 4 is mounted to the third sub-jacket tube 33 of the jacket tube 3 and has a fourth thorough orifice 40 in the vertical direction. The fourth tube 14 penetrates the through orifice 40, such that the tube body 1 is rotatable with respect to the sleeve component 2, the jacket tube 3, and the lid 4.

In the spinning device S, the sleeve component 2 and the jacket tube 3 are located at the same side on the end of the tube body 1, and the end surface of the first tube 11 is horizontal or forms a beveled angle with respect to the vertical direction.

The spinning device S further comprises a rotatable ring 5 which is penetrated through by the fifth tube 15, for the belt (not shown) to drive the rotation of the rotatable ring 5 and the tube body 1.

The driving device S further comprises a pillar 51. The fifth tube 15 further comprises a groove 150 on the outer surface thereof. The rotatable ring 5 further comprises a horizontal through hole 50, which is penetrated by the pillar 51 so that the pillar 51 abuts the vertical groove 150 to locate the rotatable ring 5 on the predetermined location of the fifth tube 51. The pillar 51 can be a screw or a bolt, and the rotatable ring 5 can be a gear.

Furthermore, in the spinning device S, a liquid-tight coupling is formed between the fourth tube 14 and the fourth through hole 40. The fourth tube 14 further comprises an O-ring 141 to achieve the liquid-tight coupling.

In the spinning device S, a groove 130 is formed on the outer surface of the third tube 13 so as to form the fluid passage P.

Figure 2:
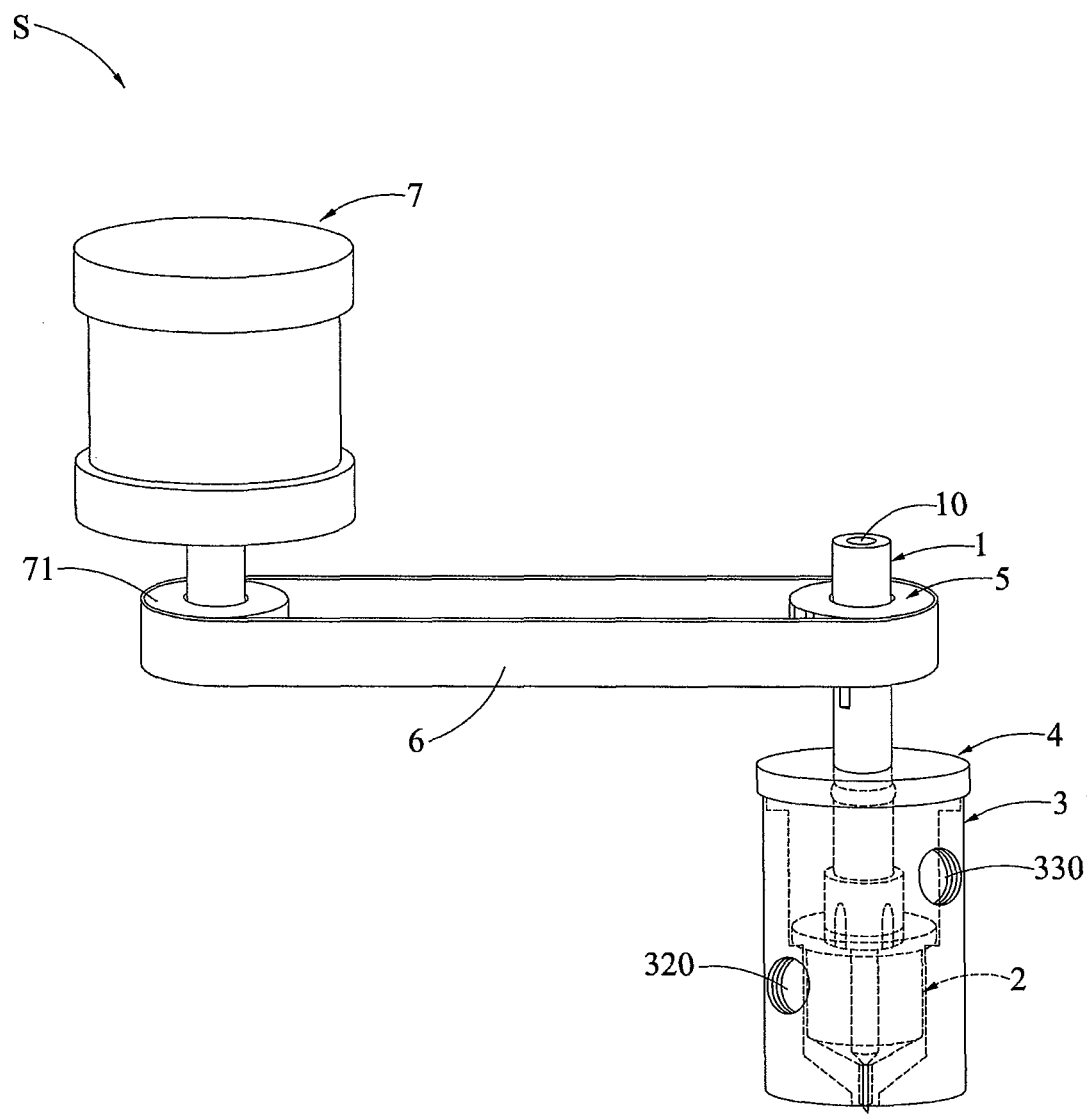
FIG. 2 is a schematic view showing the spinning device according to an embodiment of the present disclosure.

FIG. 2 is a schematic view showing the spinning device S according to an embodiment of the present disclosure.

As shown in FIG. 2, by powering the motor 7, the toothed belt 6 is engaged with the rotatable ring 4 and the driving end 71 of the motor 7, to enable the tube body 1 to rotate with respect to the sleeve component 2, and the jacket tube 3 and the lid 4.

During operation of the spinning device S of the present disclosure, the bore fluid passes through the first through orifice 10 of the tube body 1, and the first spinning dope containing inorganic adsorbent material is introduced into the second through hole 330, and passes though the fluid passage P to the second through orifice 20 of the first sleeve 21. The second spinning dope containing conductive materials is introduced into the first opening 320, and passes through the third through orifice 30 of the first sub jacket tube 31.

Accordingly, the bore fluid, first spinning dope and second spinning dope join at the bottom of the spinning device and leave the spinning device. Meanwhile, the tube body 1 rotates at 1-200 rpm. After the bore fluid, the first and second spinning dope leave the spinning device, a solidification process is performed, such that a hollow fiber having a spiral shaped passage of 1-200 mm pitch is formed.

In summary, since the tube body of the spinning device of the present disclosure is rotatable with respect to the sleeve component, the jacket tube and the lid, and the end of the tube body forms a beveled angle in a range from 0° to 90° with respect to the vertical direction, a hollow fiber with a spiral shaped passage can be formed and is different from the conventional hollow fiber. The spiral passage interferes with the flow of the gas or fluid, so as to increase the absorption, adsorption, separation or filter efficiency of the hollow fiber. In addition, the spiral shaped passage increases the length of the passage, thereby increasing the time for the gas or fluid to pass through, and further enhancing the absorption, adsorption, separation or filter efficiency.

The present disclosure has been described using exemplary embodiments. However, it will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A spinning device, comprising:
    a tube body having a first through orifice in a vertical direction;
    a sleeve component having a second through orifice in the vertical direction, wherein the tube body is pivotally disposed in the second through orifice to form a fluid passage between the tube body and the sleeve tube;
    a jacket tube having a third through orifice in the vertical direction, and having a first sub-jacket tube vertically and sequentially connected with a second sub-jacket tube, and a third sub-jacket tube in the third through hole, such that the sleeve component and the tube body are respectively mounted in the first sub-jacket tube, the second sub-jacket tube and the third sub-jacket tube, wherein a first liquid-tight coupling is formed between the sleeve component and the third sub-jacket tube, and the second sub-jacket tube and the third sub-jacket tube have a first opening and a second opening respectively, and wherein the second opening is connected to the fluid passage;
    a lid mounted to an end of the third sub-jacket tube of the jacket tube, and having a fourth through orifice in the vertical direction, such that the tube body is pivotally disposed in the jacket tube, penetrates the fourth through orifice, and is rotatable with respect to the sleeve component, the jacket tube, and the lid; and
    a belt and a rotatable ring, which is penetrated through by the tube body, so as for the belt to drive a rotation of the rotatable ring and the tube body.

2. The spinning device of claim 1, wherein an end surface of the tube body at the same side as the sleeve component and the jacket tube forms a beveled angle in a range of greater than 0° and less than 90° with respect to the vertical direction.

3. The spinning device of claim 1, wherein the tube body has a first tube vertically and sequentially coupled to a second tube, a third tube, a fourth tube and a fifth tube.

4. The spinning device of claim 3, wherein the sleeve component has a first sleeve vertically and sequentially coupled to a second sleeve, and a third sleeve, the first tube and the second tube are respectively disposed in the second through orifice of the first sleeve and second sleeve, and the fluid passage is formed between the third tube and third sleeve.

5. The spinning device of claim 4, wherein the first sleeve, the second sleeve, and the third sleeve are respectively disposed in the third through orifice of the first sub jacket tube, the second sub-jacket tube and the third sub jacket tube, and a second liquid-tight coupling is formed between the third sleeve and the third sub jacket tube of the jacket tube.

6. The spinning device of claim 3, wherein the rotatable ring is penetrated through by the fifth tube.

7. The spinning device of claim 6, further comprising a pillar, wherein the fifth tube further comprises a vertical groove on an outer surface thereof, and the rotational ring further comprises a horizontal through hole, and wherein the pillar penetrates the horizontal through hole and abuts the vertical groove.

8. The spinning device of claim 7, wherein the pillar is a screw or a bolt.

9. The spinning device of claim 6, wherein the rotatable ring is a gear, and the belt is a toothed belt.

10. The spinning device of claim 3, wherein a third liquid-tight coupling is formed between the fourth tube and the fourth through hole.

11. The spinning device of claim 10, wherein the fourth tube further comprises an O-ring.

12. The spinning device of claim 3, wherein the third tube further comprises a groove on an outer surface thereof to form the fluid passage.

* * * * *